United States Patent
Liang

(10) Patent No.: US 6,738,811 B1
(45) Date of Patent: May 18, 2004

(54) METHOD AND ARCHITECTURE FOR MONITORING THE HEALTH OF SERVERS ACROSS DATA NETWORKS

(75) Inventor: Charles Liang, Fremont, CA (US)

(73) Assignee: Supermicro Computer, Inc., San Jose, CA (US)

( * ) Notice: Subject to any disclaimer, the term of this patent is extended or adjusted under 35 U.S.C. 154(b) by 0 days.

(21) Appl. No.: 09/540,154

(22) Filed: Mar. 31, 2000

(51) Int. Cl.⁷ .................. G06F 15/173; G06F 11/00
(52) U.S. Cl. .............................. 709/224; 714/47
(58) Field of Search ........................ 709/223, 224; 714/47, 57, 2; 454/184; 702/33

(56) References Cited

U.S. PATENT DOCUMENTS

| | | | | |
|---|---|---|---|---|
| 5,761,085 A | * | 6/1998 | Giorgio .................. | 709/224 |
| 5,819,177 A | * | 10/1998 | Vucetic et al. ............. | 455/425 |
| 5,930,476 A | * | 7/1999 | Yamunachari et al. ...... | 709/224 |
| 6,105,146 A | * | 8/2000 | Tavallaei et al. ............ | 714/2 |
| 6,122,758 A | * | 9/2000 | Johnson et al. ............. | 714/47 |
| 6,145,098 A | * | 11/2000 | Nouri et al. ................ | 714/31 |
| 6,178,529 B1 | * | 1/2001 | Short et al. ................ | 709/223 |
| 6,319,114 B1 | * | 11/2001 | Nair et al. .................. | 454/184 |
| 6,446,123 B1 | * | 9/2002 | Ballantine et al. ......... | 709/224 |
| 6,490,620 B1 | * | 12/2002 | Ditmer et al. .............. | 709/224 |
| 2001/0056483 A1 | * | 12/2001 | Davis et al. ................ | 709/224 |

* cited by examiner

Primary Examiner—David Wiley
Assistant Examiner—Joseph E. Avellino
(74) Attorney, Agent, or Firm—Joe Zheng; C. P. Chang; Pacific Law Group, LLP

(57) ABSTRACT

A health diagnostic system capable for monitoring the health condition of computing device on a network is disclosed. According to one aspect of the present invention, a computing device is installed a module that can provoke the monitoring process that periodically samples values representing the health condition of the computing device. The sampled values are then sent back to the monitoring server for analysis. Meanwhile a monitoring server receives the sampled values and performs data analysis to determine if the computing device is in a good/poor condition based on historic data that are further used to predicate what the remaining time is for the computing device to actually break down so that necessary measures may be taken to prevent an actual breakdown.

49 Claims, 7 Drawing Sheets

| ID | Parameters | device info | other info |
|---|---|---|---|
| 93843 | Power, Temperature ... | (UNIX ... ...) | Report every hour |
| 43823 | Parameter 1, Parameter 2, ..... | (WIN NT, DELL...) | IP address |
| ••• | ••• | ••• | |

Fig. 3

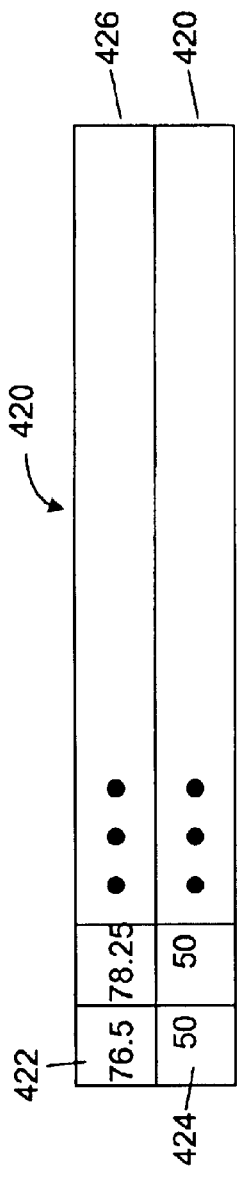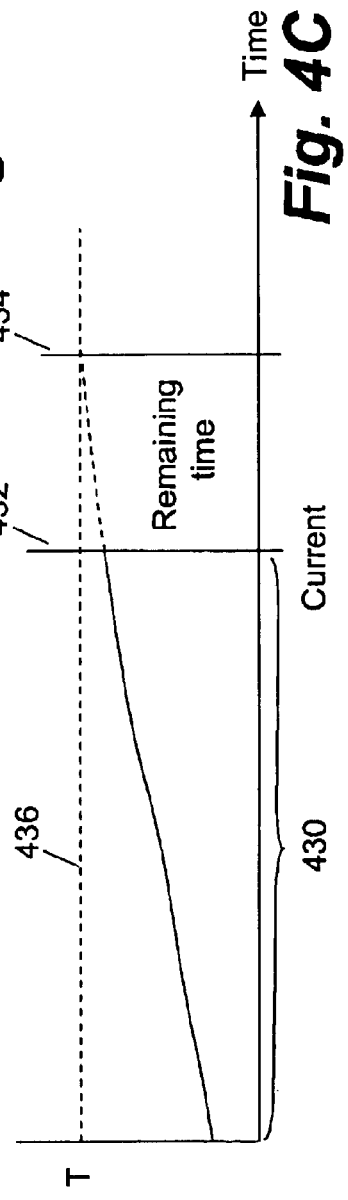
Fig. 4A
Fig. 4B
Fig. 4C

|  | Actual value | Surrounding value | other | Time stamp |
|---|---|---|---|---|
| Power Supply | 78.8 °C | 59.5 °C | *** | 13.25 |
| Cooling Fan | 6525 rpm | 59.5 °C | *** | 13.26 |
| Hard Disk | 5893 rpm | 124000 bps | *** | 13.26 |
| ...... | ...... | ...... | *** | ...... |

*Fig. 6*

METHOD AND ARCHITECTURE FOR MONITORING THE HEALTH OF SERVERS ACROSS DATA NETWORKS

BACKGROUND OF THE INVENTION

1. Field of the Invention

The present invention generally relates to computer data networks and more particularly relates to methods and architectures for managing health of computer servers across one or more data networks by constantly monitoring the status of vital components and parameters of the computer servers, wherein the status information is collected for analysis and breakdown predication and/or subsequently to determine what measures shall be taken before the computer servers actually break down.

2. Description of the Related Art

The Internet is a data communication network of interconnected computers and computer networks around the world and is rapidly evolving to the point where it integrates elements of telecommunications, computing, broadcasting, publishing, commerce, and information services into a revolutionary business infrastructure. The economy on the Internet is growing in every aspect of life, a wide range of businesses including stock trading, commodities, products, and services ordering are all via the Internet. The infrastructure that supports the Internet economy is a network of numerous computer servers running nonstop all over the Internet. If one of the servers is down, the business relying on the server may be significantly affected. One of the examples that was largely publicized is one of the famous auction web sites, Ebay, that suffered from a breakdown period of a few hours. As a result, Ebay had to be responsible for all costs related to the breakdown in addition to numerous complaints from users all over the world.

The health of a server is extremely important to an online business. A server typically comprises many components and executes numerous applications respectively or collectively at the same time. Any one of the components and applications can malfunction due to many unpredictable conditions and unknown reasons and subsequently causes the entire server to break down. To prevent any damages to the operations, many online businesses use a backup system, namely a secondary server is prepared to operate once the primary one breaks down. In reality, however, the backup server solution is not secure either. Not only does the backup server solution cost nearly twice as much as the single server, but also there is the same likelihood that the secondary server may break down any time, except the likelihood for both of the primary and the secondary servers to break down at the same time is significantly lower. Further the only time that a business becomes aware of a serious problem with the server is that the server is indeed in a poor or breakdown condition and damages as the result of the condition may have occurred.

There is therefore a great need for solutions that can automatically inform online businesses of the status of their servers in time and further provide solutions/measures/services to obviate any possible breakdown.

SUMMARY OF THE INVENTION

The present invention has been made in consideration of the above described problems and needs and can be advantageously used in a data network, such as a local area network or the Internet. With the present invention, the health condition of each single computing device on the network can be monitored periodically and provided managed cares when a need arises.

According to one aspect of the present invention, a computing device to be monitored is installed with a piece of hardware or software. After the computing device is registered with a monitoring server remotely located with respect to the computing device, the hardware or software module can provoke the monitoring process that periodically samples values representing the health condition of the computing device. The sampled values are then sent back to the monitoring server for analysis.

According to another aspect of the present invention, a monitoring server receives messages periodically from all of the computing devices on a network that are registered for being monitored. Each of the messages may include a plurality of sampled values, some being corresponding surrounding values. Typically, each of the values represents one of the parameters being specifically and periodically sampled.

The monitoring server maintains a database that includes information regarding each of the registered computing devices and one or more data areas. At least one of the data areas is used to keep history for each of the parameters being monitored. At least another one of the data areas is used to keep the sampled values for a defined period and refreshed after the sampled values are consolidated in the history data area. The historic data in the history data area are used to predicate based on a latest sampled value what the remaining time may have for the parameter to actually break down so that necessary measures may be taken to prevent an actual breakdown.

According to still another aspect of the present invention, a health diagnostic system is provided that can automatically detect or predict a failure of a registered computing device. The prediction is performed by software and/or hardware units built into the system. There are many critical parts in a registered computing device that can be monitored. For example, CPU thermostat, motherboard thermostat, chassis thermostat, cooling fan speed and voltages of many critical points of the registered computing device. A proxy server is configured to gather data from the registered computing device for diagnostic and preventative purpose. Further, a monitoring server that can be the proxy server or a centralized server coupled to the proxy server is configured with an expert system based on historic data collected over the time to predict when the registered computing device may experience a breakdown due to the failure of one of the parameters being monitored. If the prediction is critical to the computing device, the owner of the device is notified of "the sickness" by, for example, email, pager or phone. Depending on the "sickness" level, different measures may be taken to restore the health of the computing device.

Accordingly, one of the objects in the present invention is to provide a healthy network system to computing devices on a data network. Other objects, together with the foregoing are attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

FIG. 3 illustrates an exemplary list in which an ID column maintains a list of identifiers, each identifies a registered server;

FIG. 4A shows a table recording a parameter measurement received, for example, the temperature of a power supply;

FIG. 4B shows a corresponding table consolidating measurement collected in the table of FIG. 4A;

FIG. 4C shows a curve approximating row data in the table of FIG. 4B;

FIG. 6 shows an exemplary data representation in a message received from a registered server.

DETAILED DESCRIPTION OF THE PREFERRED EMBODIMENTS

Notation and Nomenclature

In the following detailed description of the present invention, numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention.

The detailed descriptions of the present invention in the following are presented largely in terms of procedures, steps, logic blocks, processing, and other symbolic representations that resemble data processing devices coupled to networks. These process descriptions and representations are the means used by those experienced or skilled in the art to most effectively convey the substance of their work to others skilled in the art. The present invention is a method and architecture for managing the health of servers across one or more data networks. The method along with the architecture to be described in detail below is a self-consistent sequence of processes or steps leading to a desired result. These steps or processes are those requiring physical manipulations of physical quantities. Usually, though not necessarily, these quantities may take the form of electrical signals capable of being stored, transferred, combined, compared, displayed and otherwise manipulated in a computer system or electronic computing devices. It proves convenient at times, principally for reasons of common usage, to refer to these signals as bits, values, elements, symbols, operations, messages, terms, numbers, or the like. It should be borne in mind that all of these similar terms are to be associated with the appropriate physical quantities and are merely convenient labels applied to these quantities. Unless specifically stated otherwise as apparent from the following description, it is appreciated that throughout the present invention, discussions utilizing terms such as "processing" or "sending" or "verifying" or "displaying" or the like, refer to the actions and processes of a computing device that manipulates and transforms data represented as physical quantities within the computing device's registers and memories into other data similarly represented as physical quantities within the computing device or other electronic devices.

The Preferred Embodiment

Figure 1A:
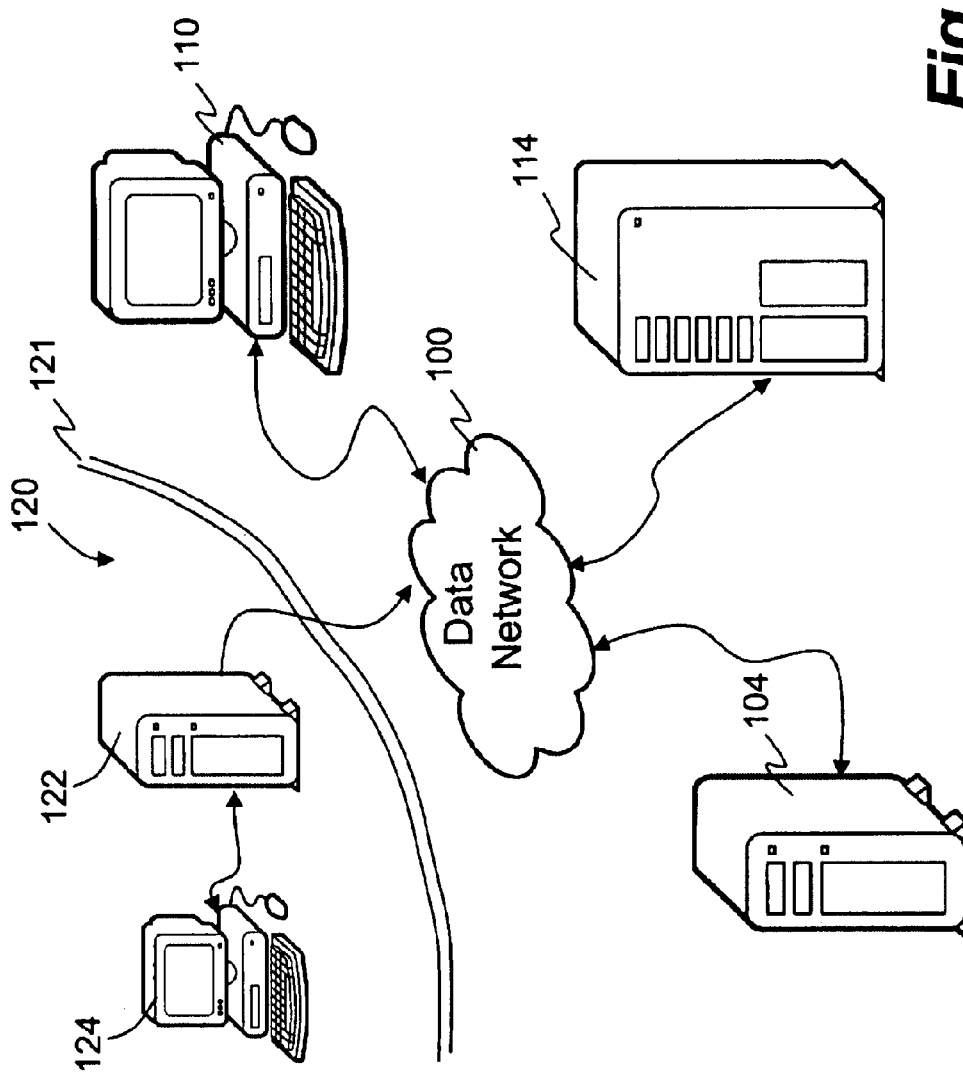
FIG. 1A shows a system configuration in which the present invention may be practiced.

Referring now to the drawings, in which like numerals refer to like parts throughout the several views. FIG. 1A illustrates a system configuration in which the present invention may be practiced. Data network 100 may be the Internet, the Intranet and a data network of other public or private networks. Coupled to network 100 are a personal computer (PC) 110 and a network server 104. Personal computer 110, representing one of many computing devices on the network, may be a Pentium-based desktop personal computer while network server 104, representing one of many online businesses, may be a workstation from SUN Microsystems Inc (see www.sun.com). In one situation, personal computer 110 runs a HyperText Markup Language (HTML) browser, such as Netscape Navigator from Netscape Communications Corporation (see www.netscape.com) via network 100 using HyperText Transfer Protocol (HTTP) to access information stored in network server 104. Network server 104 is typically operated by a business such as www.ebay.com as an online auction site, www.amazon.com as a super electronic retailer selling from books to consumer electronics. Typically, the information stored in network server 104 is hypermedia information to facilitate various transactions with users.

Also shown in FIG. 1A is a private network 120 including a computer 124 and a server 122, private network 120 is protected by a firewall 121 protecting resources of the private network from users on other networks. Private network 120 is typically used in a corporate configuration in which secure information is kept in server 122 and accessible only by computing devices, such as computer 124, on private network 120.

For computers 110 and 124 to function properly with network resources on network 100, both servers 122 and 104 must be operating normally. If one of the servers breaks down, services provided from the server will be stopped and users depending on the server will be affected.

Figure 1B:
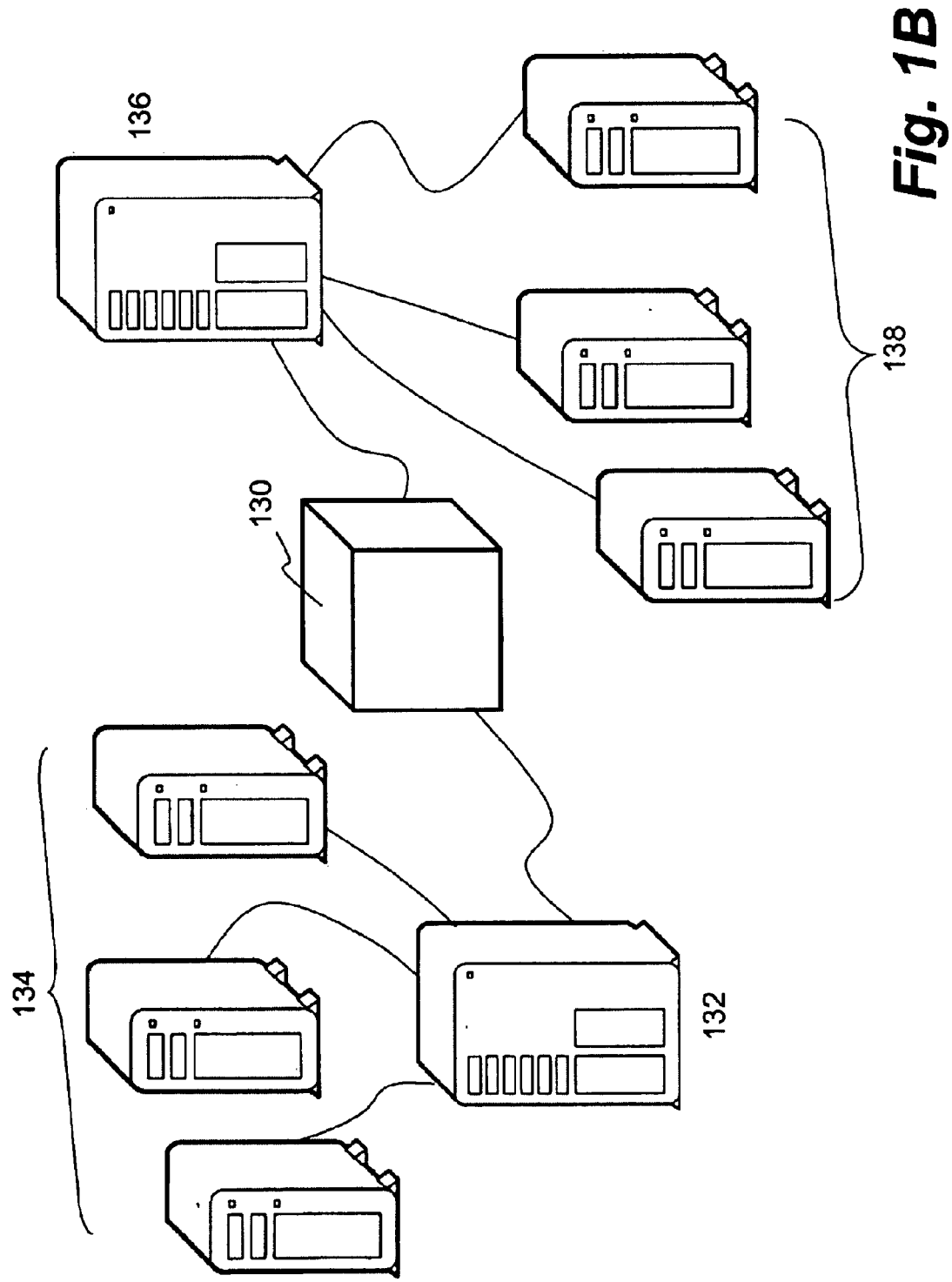
FIG. 1B shows another system configuration in which the present invention may be practiced.

One of the features in the present invention is to host, on network 100, a server 114, referred to hereafter as a monitoring server, that is configured to monitor the status of each of registered servers on network 100. According to one preferred embodiment shown in FIG. 1B, server 114 is one of many proxy (monitoring) servers (i.e. 132 and 136) scattering across a data network, each of the proxy servers acts as a monitoring server. All of the proxy servers may be further coupled to a central server 130 that performs, along with one or more of the proxy servers, some or all of status analysis and/or predication and/or repairing services for each of the registered servers. In another perspective, each of the proxy servers serves as a regional monitoring server responsible for monitoring a group of registered servers such as server 132 responsible for a group of registered servers 134 and server 136 responsible for a group of registered servers 138.

In the following description, a monitoring server may mean interchangeably the central server or one of the proxy servers. It will become evident to those skilled in the art that the functions performed by the monitoring server may be carried in the central server and/or in one or more of the proxy servers.

Preferably, each of the registered servers is accessed on a predefined time frame, for example, every day or every hour, depending on the importance of the server or any specific requirement by the owner of the server. The "registered" means that those servers are made to permit server 114 to access the status thereof. Typically, a registration process is needed to sign up those servers that are desired to be monitored from time to time or periodically. The registration process may require the server to install one or more pieces of specially designed hardware or one or more software applications. The server is then registered with a monitoring server when the owner authorizes the monitoring server to collect the health information of the server. According to one embodiment, some servers sold by Super Micro Computer, Inc. (www.supermicro.com) are pre-installed with such hardware or loaded with an application. The hardware or software, when operating or being executed, either provokes the hardware or the application itself or downloads one or more applications designated at a web site to start monitoring a plurality of predefined parameters of designated applications/programs/parts executing/running in the server. According to another embodiment, a software application can be directly downloaded from a web site to a server desired to be monitored. The software application is executed in the server and then collects the status information for a monitoring server remotely located with respect to the server.

The status may include, but not be limited, to parameters of applications/programs being executed and components being functioning in a registered server. The exemplary parameters may include, but not be limited to, memory leakage status, various standards compliance, temperature of a power supply, the rotating speed of the hard disk and cooling fan conditions in the registered server. Based on the description herein, it will be evident to those skilled in the art that additional parameters or status may be collected and provided to a remotely located monitoring server for determination of the health condition of the registered server.

Based on a set of criteria for each of the registered servers, server 114 concludes a status condition respectively for each of the registered servers. If the condition of a particular server is concluded critical, necessary measures shall be taken. The measures may include, but not be limited to, notifying the owner thereof (i.e. the business owes the server), providing solutions, arranging replacement or scheduling repairs, automatically in a preferred embodiment.

Figure 2:
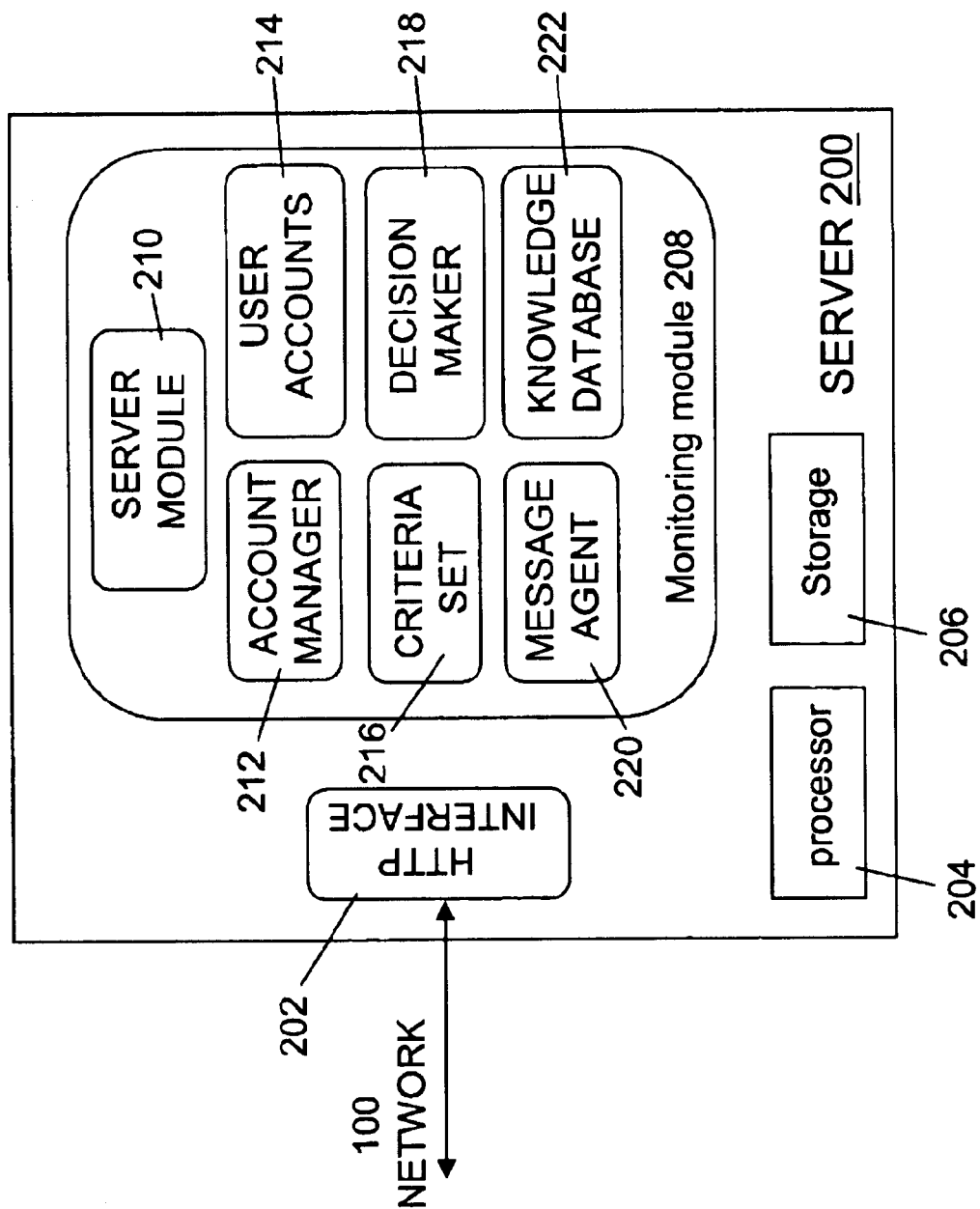
FIG. 2 shows a block diagram of a monitoring server according to one embodiment of the present invention.

To further understand the present invention, referring now to FIG. 2, there is shown a block diagram of a monitoring server 200 according to one embodiment of the present invention. Server 200 may correspond to server 114. Network interface 202 in server 200 facilitates a data flow between data network 100 and server 200 and typically executes special set of rules (a protocol) to send data back and forth. One of the common protocols is TCP/IP (Transmission Control Protocol/Internet Protocol) commonly used in the Internet. Network interface 202 manages the assembling of a message or file into smaller packets that are transmitted over data network 100 and reassembles received packets into the original message or file. In addition, it handles the address part of each packet so that it gets to the right destination.

Further server 200 comprises a processor 204, a storage space 204 and a monitoring module 208, wherein monitoring module 208 is a compiled and linked version of a set of code implementing the present invention. When executed by processor 204, monitoring module 208 performs a number of functions to facilitate the operations of the present invention.

It should be pointed out that monitoring module 208 may be implemented with specially designed hardware. From the description herein, those skilled in the art will have no difficulty to come up with other implementation methods to get the functionality achieved by the present invention. In practice, any computing device having reasonable computing resources (i.e. processor power and memory capacity) may be implemented as a monitoring server.

Monitoring module 208 includes a server module 210, an account manager 212, user accounts 214, a criteria set 216, a decision maker 218, a message agent 220 and knowledge database 222. Server module 210 facilitates monitoring module 208 to communicate with registered servers coupled on.network 100. Account manager 212 manages those registered servers and permits an administrator or operator of server 200 (i.e. monitoring module 208) to update a list of the registered servers. Every time a business decides to have its servers monitored by server 200, the operator accesses account manager 212 that causes the list of the registered servers in user account 214 updated accordingly.

User accounts 214, typically communicating with a storage space, such as storage 206, maintains the actual list of the registered servers. FIG. 3 illustrates an exemplary list 300 in which ID column 302 maintains a list of identifiers, each identifies a registered server. In addition, parameters column 304 in list 300 maintains a plurality of parameters or name of components to be monitored in a registered server. Device information 306 in list 300 provides information regarding each of the registered servers, for example, the operating system a server runs. Other information column 312 comprises pertinent information regarding the registered servers, the pertinent information may include, but not be limited to, an IP address of the server, how often a server shall be monitored, how the status of the server shall be reported, or what measures shall be provided if the server is in a critical condition.

For example, a server has an IP address of www.xyzcorp.com and operates on network 100. After the owner of the server registered with the operator of the monitoring server, exemplary list 300 is updated, the server is assigned to an identifier 93843, one of the parameters in the server that should be monitored is the temperature, one of the components in the server is the power unit. Further it is required that the parameters and components shall be monitored every hour, measures must be provided when one of the parameters and one of the components are off a predefined range.

Referring back to FIG. 2, criteria set 216 maintains data ranges for each of the parameters. For example, a temperature of a power supply in a registered server shall be between 72 degree and 92 degree with respect to a certain room temperature. If the temperature sampled and collected is beyond the predefined range, the owner of the server is automatically notified. In operation, decision maker 218 determines if a sampled parameter received from a server is beyond the predefined range and causes message agent 220 to automatically generate a message to notify the owner of the server from which the sampled parameter is received.

One of the important features in the present invention is the use of knowledge database 222 with which decision maker 218 makes meaningful decisions. According to one embodiment, knowledge database 222 maintains historic data for each of the parameters being monitored.

Referring now to FIG. 4A, there is shown a table 400 recording a parameter measurement received, for example, the temperature of a power supply. In terms of the temperature example, row 402 records the actual measured temperature sampled every hour and row 404 records the environment temperature in which the actual temperature is measured. According to one embodiment, a respective function or curve may be derived from the samples in row 402 or 404. The derivation of such function or curve is well known in the art. The function or curve can be used as a base to detect any abnormal measurement. When a measured value 406 comes, a comparison of the value to the derived curve may indicate that value 406 is "extraordinary" together in view of the environment temperature 408. A necessary measure may be taken or the owner of the server shall be notified immediately.

It should be noted that table 400 illustrates that two related data are sampled every time a parameter is monitored. Those skilled in the art may understand that more related data may be sampled at the same time when a particular parameter is monitored. For example, to monitor the status of a fan used in a server to lower down the temperature around a power supply. There are a number of data that could be collected to determine the status of the fan. Examples include the speed of the fan, the power voltage to the fan and the surrounding temperature of the fan. All may be collected at the same time and could be analyzed separately or jointly. Therefore table 400 is just an example to illustrate a simplified situation and shall not be interpreted as any limitation to the current invention.

The data in table 400 is sampled based on a predefined time interval. According to one embodiment, the data samples in table 400 are consolidated at a certain time, for example, at the end of a day. The data consolidation means herein that the data are combined into a representation representing a measurement of a period. FIG. 4B shows an example 420 storing the represented value. Specifically, at the end of a day, data in table 400 are automatically consolidated into a single representation 422 and 424, which means the average temperature for the particular day is around a value in 422 and the corresponding average surrounding temperature is around a value in 424. Meanwhile table 400 can be refreshed for a next day measurement. Over the time, table 420 collects a series of historic data. One of the features in the present invention is to predicate a possible breakdown of a component or a part in a server or the server itself based on the historic data.

FIG. 4C shows a curve approximating row data 426 in table 420. It is assumed that a threshold that could lead to a breakdown is T. When the status of a parameter is worsening, which typically reflects in the historic data 430, it is possible to predict what the remaining time may be for the status to reach the threshold. The calculation can be performed based on a number of mathematical schemes. In the case of the temperature parameter monitoring, the remaining time can be fairly accurately determined when the temperature is homogeneously increasing.

FIGS. 4A–4C show an example how knowledge base 222 of FIG. 2 may be implemented according to one embodiment. Given the description above, it is not difficult for those skilled in the art to implement various forms knowledge base 222 without departing the features presented herein.

In operation, when the remaining time is determined, the owner of the server being monitored can be notified by a message from message agent 220. The message may come as an electronic email, an alert or other means to notify the owner of the status. According to embodiment, the message includes a list of service providers that could supply solutions to overcome problems detected or predicated. In one situation, one of the service providers is offering new fans. This particular service provider will be provided to the owner so that the owner knows how and where to order the correct parts. In another situation, the message itself includes a confirmation that a replacement has been ordered from one of the preferred vendors. Further the message may include when and where the replacement will arrive.

Figure 5:
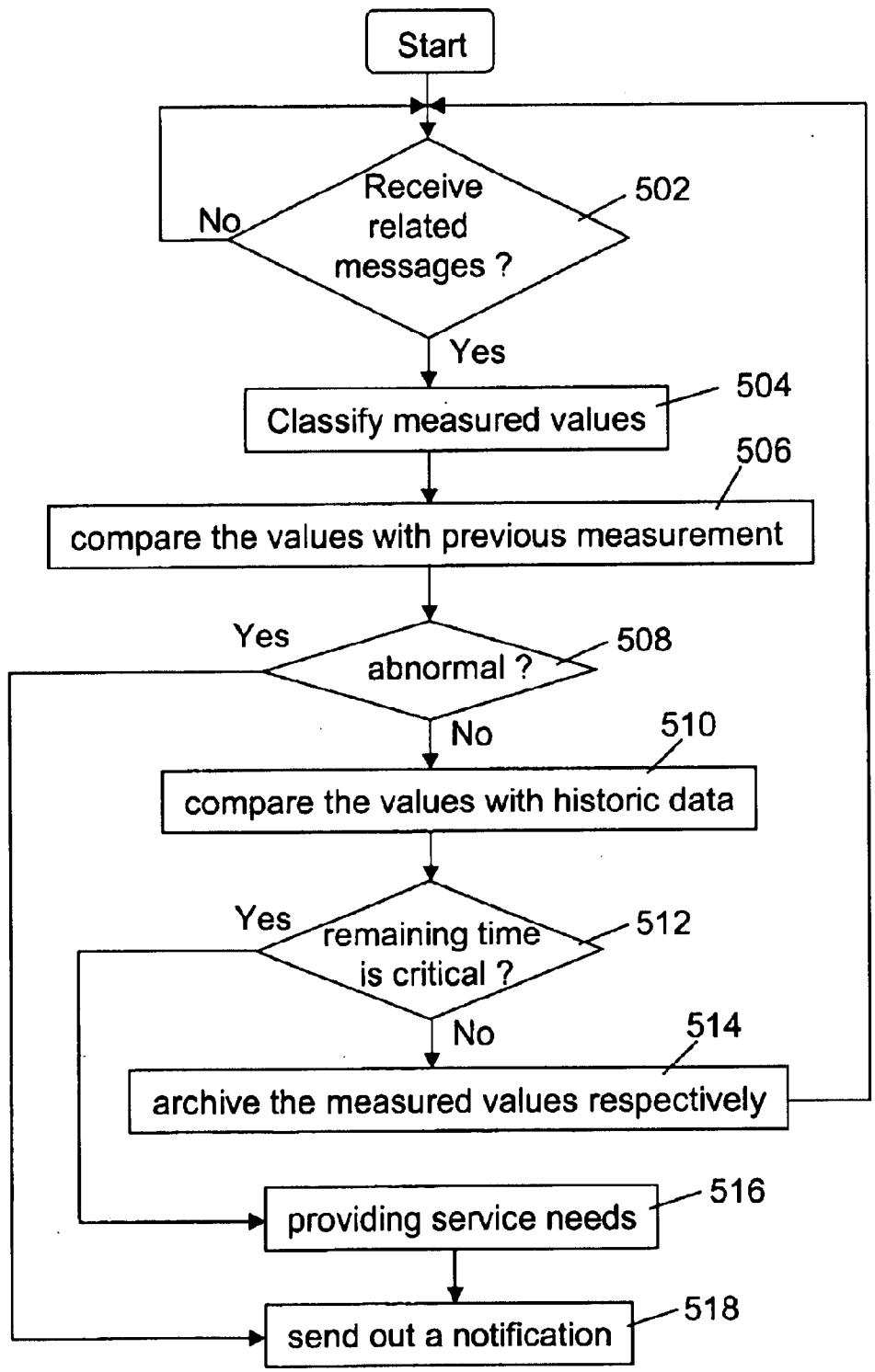
FIG. 5 shows a process flowchart of the present invention according to one embodiment.

Referring now to FIG. 5, there is shown a process flowchart of the present invention according to one embodiment. It should be noted that the blocks in FIG. 5 do not inherently indicate any particular order nor imply any limitations in the present invention. At 502, a monitoring server awaits any message from a data network. When a message arrives, the server typically checks if the message is relevant to the monitoring process. When the message arrived is from one of the registered servers on the network, the message is processed to extract relevant information according to a predefined data structure in the message. The relevant information includes groups of various sampled values depending on an exact implementation. According to one implementation, some of the values may be represented in a table shown in FIG. 6. Specifically, for a particular component, e.g. a cooling fan, in the registered server, the actual fan speed is sampled together with other surrounding values that may include the surrounding temperature and other related values. The surrounding temperature and other related values provide necessary background information for the monitoring server to make a justified decision as to whether the actual fan speed is normal or abnormal.

At 504, the received values are classified preferably into different categories, such as for power supply, fan condition, and hard disk condition, etc. the classification of all the sampled values make the data processing meaningful and efficient. Besides to judging the measured or sampled value in view of the surrounding temperature and other related values, the server further compares at 506 the sampled value or values with previously stored corresponding values to compare if the sampled value or values are abnormal or in poor or critical condition.

At 508, if the condition is abnormal, a notification is automatically sent out to the owner of the registered server. If the condition is normal, at 510, the sampled value or values are compared with the historic data to predict when possibly a particular component may fail. At 512, the remaining time is determined if it is critical or not. This may be achieved by analyzing the pertinent historic data to find out the trend from which a remaining time to a breakdown may be estimated. If the remaining time is critical, such as less than 2 weeks, service needs may be automatically placed at 516. The service needs may include an order of a replacement and one or more adjusted parameters to be sent to the corresponding registered server to cause, perhaps, an ongoing application to readjust its status, or clean up the memory or residual values in the memory. If the remaining time is not critical, for example, a few months based on current deteriorating rate, the sampled values are archived to update the historic data as described above.

The invention is preferably implemented in software, but can be implemented in hardware or a combination of hardware and software. The invention can also be embodied as computer readable code on a computer readable medium. The computer readable medium is any data storage device that can store data that can thereafter be read by a computer system. Examples of the computer readable medium include read-only memory, random-access memory, CD-ROMs, magnetic tape, optical data storage devices, carrier waves. The computer readable medium can also be distributed over a network coupled computer systems so that the computer readable code is stored and executed in a distributed fashion.

The advantages of the invention are numerous. Different embodiments or implementations may yield one or more of the following advantages. One advantage of the invention is that the health condition of each of the computing devices on an open network such as the Internet can be monitored remotely. Another advantage of the invention is to provide a computer health network, like a managed health network for human beings, which integrates with part suppliers and other resourceful parties that can be called upon to provide help when one of the computing devices on the network is in a critical condition. Still another advantage of the invention is the ability provided by the monitoring server to predict what is a remaining time for a parameter to break down so that necessary measures can be taken before it actually happens.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

I claim:

1. A method for monitoring the health of registered devices across a data network, the method comprising:
   receiving a message from the data network according to a predetermined schedule, the message including groups of data, each of the groups of data including at least one measured value reflecting current condition of a component running in one of the registered devices and surrounding values sampled substantially at the same time when the measured value is obtained;
   determining if the component is in a normal condition by comparing the measured value with a set of criteria designated for the component, wherein the criteria is based on at least a first and a second set of historic data, each of the first set of historic data being a consolidated representation of the measured value collected for a specific duration, and each of the second set of historic data being a consolidated representation of one type of the surrounding values collected for the same corresponding specific duration; and
   sending a notification to the data network when the component is determined to not be in the normal condition.

2. The method of claim 1, wherein the one of the registered devices is selected from a group consisting of a personal computing device, a desktop computer and a server computer.

3. The method of claim 2, wherein the one of the registered devices is coupled in the data network; and wherein the data network is the Internet.

4. The method of claim 1, wherein the one of the registered devices executes a module that samples the measured value at a predefined time.

5. The method of claim 4, wherein the module sends the message over the data network.

6. The method of claim 1, wherein the determining if the component is in a normal condition comprises comparing the consolidated representation of the measured value with the consolidated representation of the one type of the surrounding values to determine if the measured value appears abnormal.

7. The method of claim 6, wherein, when the measured value appears not abnormal, the determining if the component is in a normal condition comprises:
   comparing the measured value with a predefined range; and
   sending a notification to an owner of the one of the registered devices when the measured value is determined out of the predefined range.

8. The method of claim 6, wherein, when the measured value appears not abnormal, the determining if the component is in a normal condition comprises predicating a remaining time of the component to operate normally based on comparing the measured value to a set of historic data.

9. The method of claim 8, wherein the historic data are collected collectively before the measured value is obtained.

10. The method of claim 1, wherein the measured value is archived in a set of historic data that are collected collectively before the measured value is obtained.

11. The method of claim 1, wherein the component is a piece of hardware part operating in the registered server.

12. The method of claim 11, wherein the piece of hardware part is selected from a group consisting of a power supply, a cooling fan, a memory device, a hard disk.

13. The method of claim 12, wherein the sending a notification to the data network comprises providing solutions to restoring a health condition of the component.

14. The method of claim 13, wherein the solutions include date, time and how the component will be replaced with a replacement.

15. The method of claim 1, wherein the component is an application software module executing in the registered server.

16. The method of claim 15, wherein the sending a notification to the data network comprises providing solutions to restoring a health condition of the application software module.

17. The method of claim 16, wherein the notification includes a status report of the application software module so that an owner of the registered server understands what to do with the application software module.

18. A method for monitoring the health of registered devices across a data network, the method comprising:
   sampling a status of a number of predefined parameters of components according to a predetermined schedule;
   obtaining, substantially at the same time, respective surrounding values about each of the number of predefined parameters;
   sending a message over the network to a server, the message including the status of the predefined parameters of the components, wherein the server includes a monitoring module configured to determine whether any one of the components is in a normal condition by comparing the status of each predefined parameters with a set of criteria desigated therefor, the criteria is based on at least a first and a second set of historic data, each of the first set of historic data being a consolidated representation of the status of the each of the predefined parameters collected for a specific duration, and each of the second set of historic data being a consolidated representation of one type of the surrounding values collected for the same corresponding specific duration; and
   receiving a notification when one of the predefined parameters is determined to be abnormal.

19. The method of claim 18, wherein the notification is in a form selected from a group consisting of an email, an alert signal, a pager message and a phone call.

20. The method of claim 18, wherein the sampling status is performed by executing an application module that is configured to cause a measurement of each of the predefined parameters.

21. A system for monitoring the health of registered devices across a data network, the system comprising:
   a number of hardware units, each installed in one of the registered devices and, when operating, measuring a status of a number of predefined parameters in one of the registered devices and obtaining, substantially at the same time, respective surrounding values about each of the number of predefined parameters;

a number of software units, each installed in one of the registered devices and, when executing, sending a message to the data network, wherein the message includes the status as well as the respective surrounding values; and a monitoring server, coupled to the data network and upon receiving the message, providing a diagnostic analysis on the status included in the message by comparing the status of each of the predefined parameters with a set of criteria designated therefor, the criteria being based on at least a first and a second set of historic data, each of the first set of historic data being a consolidated representation of the status of the each of the predefined parameters collected for a specific duration, and each of the second set of historic data being a consolidated representation of one type of the surrounding values collected for the same corresponding specific duration, the monitoring server sending a notification when the diagnostic analysis determines that the status is abnormal.

22. The method of claim 21, wherein each of the hardware units causes the one of the registered devices to download a monitoring application module from a designated web site, the monitoring application module including pertinent information regarding what, when and how the number of predefined parameters shall be monitored.

23. The method of claim 21, the monitoring server further comprises:
means for receiving the message from the data network;
means for determining if the status is in a normal condition by comparing the status with a set of predefined criteria; and
means for sending the notification to the data network when the status is determined to not be in the normal condition.

24. A system for monitoring the health of registered devices across a data network, the system comprising:
a processor;
a database for storing historic data;
a memory, coupled to the processor, for storing code as a monitoring module; the code when being executed by the processor causing the monitoring module to perform operations of:
receiving a message from the data network according to a predetermined schedule, the message including groups of data, each of the groups of data including at least one measured value reflecting current condition of a component running in one of the registered devices and surrounding values sampled at substantially the same time when the measured value is obtained;
determining if the component is in a normal condition by comparing the measured value with a set of criteria designated for the component, wherein the criteria is based on at least a first and a second set of historic data, each of the first set of historic data being a consolidated representation of the measured value collected for a specific duration, and each of the second set of historic data being a consolidated representation of one type of the surrounding values collected for the same corresponding specific duration; and sending a notification to the data network when the component is determined to not be in the normal condition.

25. The system of claim 24, wherein the determining if the component is in a normal condition comprises comparing the consolidated representation of the measured value with the consolidated representation of the one type of the surrounding values to determine if the measured value appears abnormal.

26. The system of claim 25, wherein, when the measured value appears not abnormal, the determining if the component is in a normal condition comprises:
comparing the measured value with a predefined range; and
sending a notification to an owner of the one of the registered devices when the measured value is determined out of the predefined range.

27. The system of claim 25, wherein, when the measured value appears not abnormal, the determining if the component is in a normal condition comprises predicating a remaining time of the component to operate normally based on comparing the measured value to the historic data.

28. The system of claim 27, wherein the historic data are collected collectively before the measured value is obtained.

29. The system of claim 24, wherein the measured value is archived in a set of historic data that are collected collectively before the measured value is obtained.

30. A computer program product running on a server computer for monitoring the health of registered devices across a data network, the computer program product comprises:
program code for receiving a message from the data network according to a predetermined schedule, the message including groups of data, each of the groups of data including at least one measured value reflecting current condition of a component running in one of the registered devices and surrounding values sampled at substantially the same time when the measured value is obtained;
program code for determining if the component is in a normal condition by comparing the measured value with a set of criteria designated for the component, wherein the criteria is based on at least a first and a second set of historic data, each of the first set of historic data being a consolidated representation of the measured value collected for a specific duration, and each of the second set of historic data being a consolidated representation of one type of the surrounding values collected for the same corresponding specific duration; and
program code for sending a notification to the data network when the component is determined to not be in the normal condition.

31. The computer program product of claim 30, wherein the one of the registered devices is selected from a group consisting of a personal computing device, a desktop computer and a server computer.

32. The computer program product of claim 31, wherein the one of the registered devices is coupled in the data network; and wherein the data network is the Internet.

33. The computer program product of claim 30, wherein the one of the registered devices executes a module that samples the measured value at a predefined time.

34. The computer program product of claim 33, wherein the module sends the message over the data network.

35. The computer program product of claim 30, wherein the program code for determining if the component is in a normal condition comprises program code for comparing the consolidated representation of the measured value with the consolidated representation of the surrounding values to determine if the measured value appears abnormal.

36. The computer program product of claim 35, wherein, when the measured value appears not abnormal, the program code for determining if the component is in a normal condition comprises:

program code for comparing the measured value with a predefined range; and program code for sending a notification to an owner of the one of the registered devices when the measured value is determined out of the predefined range.

37. The computer program product of claim 35, wherein, when the measured value appears not abnormal, the program code for determining if the component is in a normal condition comprises program code for predicating a remaining time of the component to operate normally based on comparing the measured value to a set of historic data.

38. The computer program product of claim 37, wherein the historic data are collected collectively before the measured value is obtained.

39. The computer program product of claim 30, wherein the measured value is archived in a set of historic data that are collected collectively before the measured value is obtained.

40. The computer program product of claim 30, wherein the component is a piece of hardware part operating in the registered server.

41. The computer program product of claim 40, wherein the piece of hardware part is selected from a group consisting of a power supply, a cooling fan, a memory device, a hard disk.

42. The computer program product of claim 41, wherein the program code for sending a notification to the data network comprises providing solutions to restoring a health condition of the component.

43. The computer program product of claim 42, wherein the solutions include date, time and how the component will be replaced with a replacement.

44. The computer program product of claim 30, wherein the component is an application software module executing in the registered server.

45. The computer program product of claim 44, wherein the program code for sending a notification to the data network comprises providing solutions to restoring a health condition of the application software module.

46. The computer program product of claim 45, wherein the notification includes a status report of the application software module so that an owner of the registered server understands what to do with the application software module.

47. A computer program product running on a server computer for monitoring the health of registered devices across a data network, the computer program product comprising:

program code for sampling a status of a number of predefined parameters of components according to a predetermined schedule;

program code for obtaining, substantially at the same time, respective surrounding values about each of the number of predefined parameters;

program code for sending a message over the network to a server, the message including the status of the predefined parameters of the components, wherein the server includes a monitoring module configured to determine whether any one of the components is in a normal condition by comparing the status of each of the predefined parameters with a set of criteria designated therefor, the criteria is based on at least a first and a second set of historic data, each of the first set of historic data being a consolidated representation of the status of the each of the predefined parameters collected for a specific duration, and each of the second set of historic data being a consolidated representation of one type of the surrounding values collected for the same corresponding specific duration; and program code for receiving a notification when one of the predefined parameters is determined to be abnormal.

48. The computer program product of claim 47, wherein the notification is in a form selected from a group consisting of an email, an alert signal, a pager message and a phone call.

49. The computer program product of claim 47, wherein the sampling status is performed by executing an application module that is configured to cause a measurement of each of the predefined parameters.

* * * * *